Oct. 7, 1969   D. L. GEISELMAN   3,471,120
SEALING MEANS FOR BUTTERFLY VALVE
Filed June 20, 1966   2 Sheets-Sheet 1

INVENTOR.
DONALD L. GEISELMAN
ATTORNEY

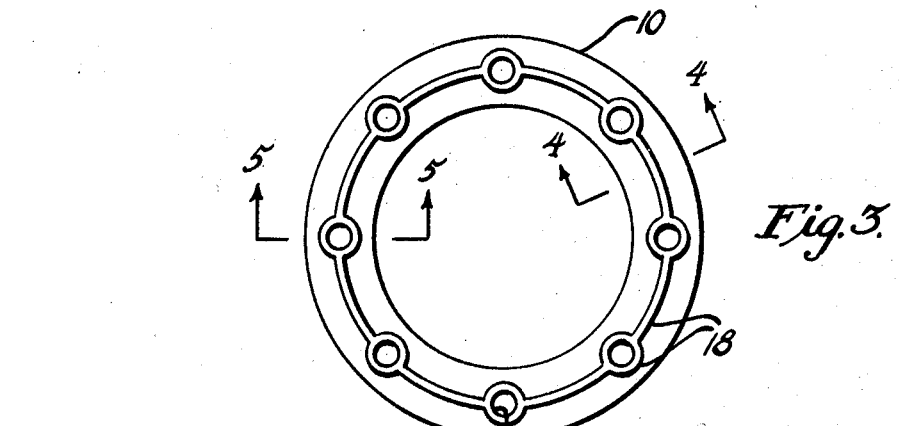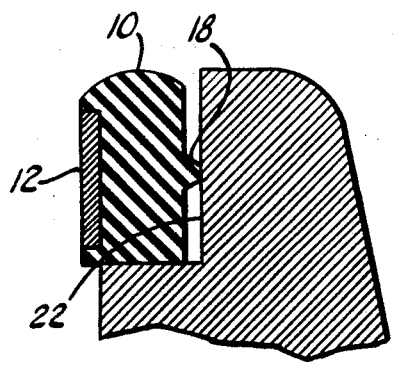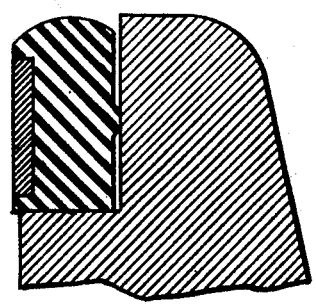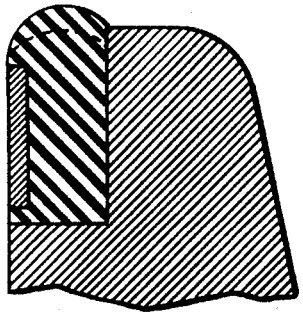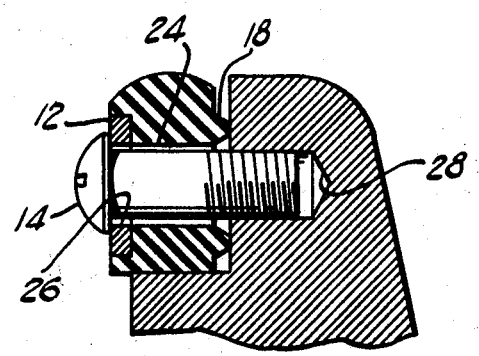

United States Patent Office 3,471,120
Patented Oct. 7, 1969

3,471,120
SEALING MEANS FOR BUTTERFLY VALVE
Donald L. Geiselman, Bradford, Pa., assignor to Dresser Industries, Inc., Dallas, Tex., a corporation of Delaware
Continuation-in-part of application Ser. No. 513,772, Dec. 14, 1965. This application June 20, 1966, Ser. No. 558,962
Int. Cl. F16k 1/226, 25/00
U.S. Cl. 251—306                                8 Claims

ABSTRACT OF THE DISCLOSURE

A butterfly valve in which an adjustable resilient gasket extends peripherally about the vane to engage the valve seat ring for fluid-tight shutoff. The gasket is toroidal shaped having a raised rib on its face for sealing engagement against the mounting face on the vane. Unless sufficiently compressed, the rib serves to maintain the remainder of the gasket face spaced from the vane and when sufficiently compressed in selective local areas will effect localized radial enlargement of the gasket peripherally against the valve seat.

---

This invention relates to butterfly valves, and more particularly resides in an adjustable sealing element.

This application is a continuation-in-part of my co-pending application, Ser. No. 513,772, filed Dec. 14, 1965, now abandoned.

The sealing surfaces of the common butterfly valve comprise a resilient ring on the vane and stationary seating ring provided within the valve housing. Complete sealing when the valve is in closed position obviously requires perfect mating between the vane sealing element and the seating ring, and considerable attention has been devoted toward this object in the prior art. The resultant designs have involved various combinations of materials and special configurations, but quite typically at least one of the sealing surfaces comprises an elastomeric circular element which relies on its own resilience for effective sealing. As such materials age and are subjected to abrasion and chemical agents, they become in need of adjustment, repair or replacement in order to continue the ability to maintain a perfect seal. Heretofore there has been no simple and effective means whereby the seating of the sealing elements could be adujsted as necessary to maintain this seal. It is important to note that it is desirable to effect such adjustment selectively, in different increments, around the circumference of the vane.

It is the principal object of this invention to provide a vane sealing element which is variably adjustable about its circumference to obtain the optimum mating relation between the valve sealing elements, simple in construction, and easily operable to effect the desired adjustments.

In accordance with this invention the above object is attained by means of a circular gasket having a special configuration whereby tightening of individual mounting screws effects variable bulging of the gasket in a radial direction toward the stationary seat ring. More specifically, this annular gasket ring has a continuous raised rib at its rearward side which is placed against the butterfly vane. The mounting screws need be tightened only sufficiently to bring this raised rib into sealing engagement with the vane surface. Beyond this initial tightening, however, the rib becomes flattened under compressive force and this causes distortion of rubber which is manifested as radial bulging at the periphery. By different degrees of tightening of the individual screws about the circumference, this radial bulging can be very simply controlled to obtain a properly uniform seating relation between the gasket and seat ring.

Further objects, advantages and details of this invention will become apparent from the following description when read in conjunction with the accompanyng drawings in which:

FIGURE 3 is a face view of the rearward side of the rubber gasket ring;

Figures 2, 6:
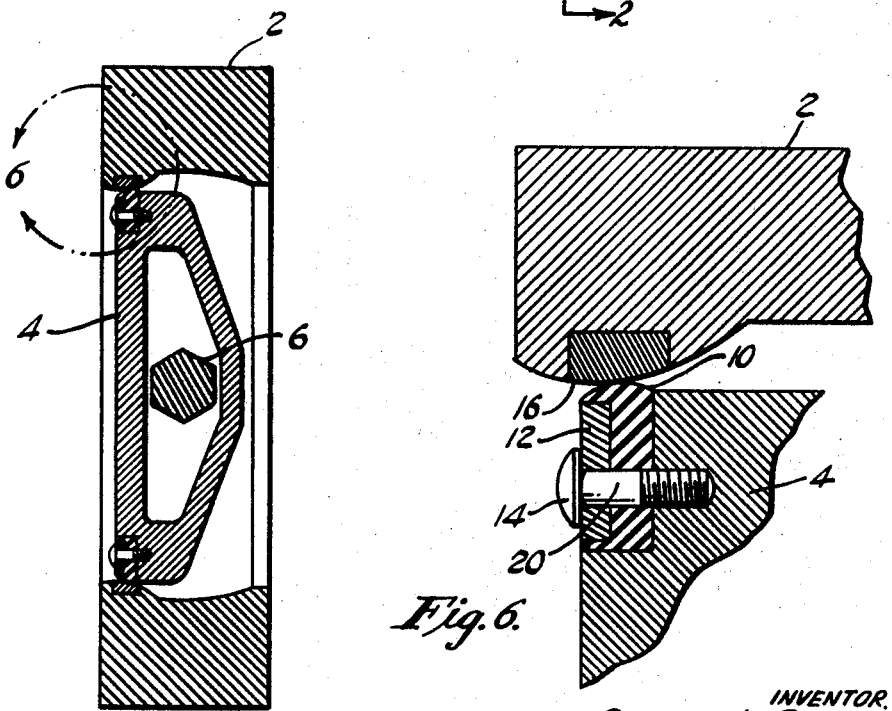
FIGURE 2 is a cross-section through the vane, taken as indicated by lines 2—2 in FIGURE 1.

FIGURES 4-A, 4-B and 4-C are enlarged partial sections through the gasket ring and vane assembly, taken at a location on the ring between a pair of holes therein as indicated by lines 4—4 in FIGURE 4, and illustrating its progressive radial bulging action;

FIGURE 5 is a cross-section similar to FIGURE 4-A but taken at a location on the gasket ring as indicated by lines 5—5 in FIGURE 3; and FIGURE 6 is an enlarged partial section of the area shown by the circle "6" in FIGURE 2, and showing the sealing relation of the gasket and seat ring when the valve is in closed condition.

Figure 1:
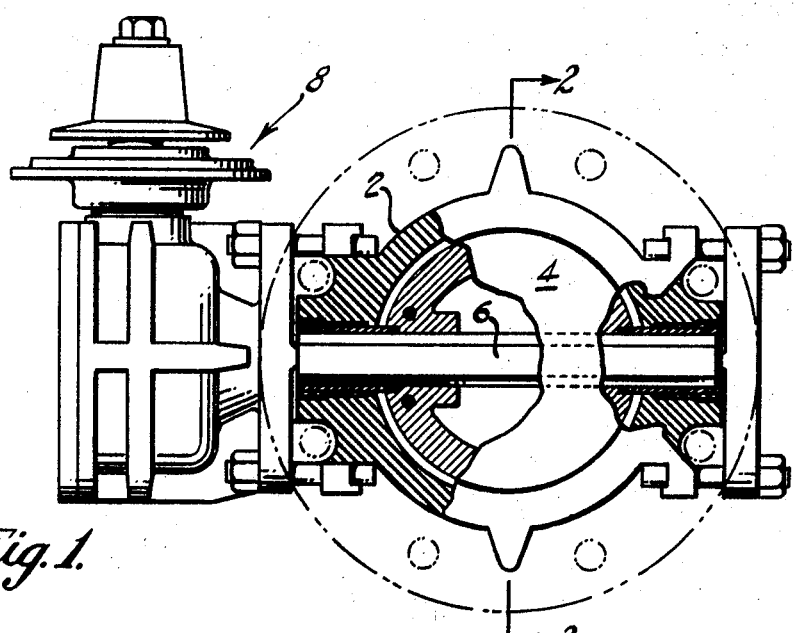
FIGURE 1 is a view, partially in cross-section and partially broken away, of a complete butterfly valve embodying this invention.

Referring to FIGURE 1, the illustrated butterfly valve has a housing 2 adapted to be coupled between sections of pipe, a vane 4 rotatably mounted by a drive shaft 6, and valve operating mechanism generally indicated at 8 for transmitting motion to the shaft 6 for controlled opening and closing of the valve. The valve operating mechanism 8 and other parts of the valve are more fully disclosed in the aforementioned application, Ser. No. 513,772, of which this application is a continuation-in-part.

The sealing elements of this valve comprise an elastomeric gasket ring 10 carried by the rotatable vane 4 and a stationary valve seat constituted by a ring 16 incorporated in the housing. The gasket ring can be formed of any of the standard rubber compositions which are specially adapted for use as gaskets in this type of application. The seat ring preferably comprises a corrosion-resistant metal such as stainless steel.

Gasket 10 is received by an L shaped gasket mounting recess 22 formed in the vane. A thin metal backup ring 12 is molded within the front face of the gasket, and has holes 26 therein in alignment with holes 24 in the rubber. A circular array of machine screws 14 are threaded into tapped holes 28 in the vane, and act against the frontal ring 12 to press the gasket against the flat surface of recess 22. The depth of tapped holes 28 limit the extent to which each screw 14 can be tightened. It will be seen from the above that the backup 12 and the screws 14 together constitute a means for variably clamping the gasket against the surface of the vane.

A significant feature of the gasket 10 resides in the continuous protuberance or rib 18 projecting beyond its rearward face. In an average size butterfly valve, this rib 18 projects approximately 1/32 to 3/32 inch beyond the rearward face of the gasket. FIGURE 4-A shows the gasket prior to tightening of the screws, with rib 18 being undeformed and in light contact with the vane. In FIGURE 4-B, the screws have been only slightly tightened, sufficient only to establish a fluid-tight seal between the gasket and vane at the location of the rib. Because the rib 18 extends radially outside the holes 24, leakage through these holes cannot occur as the rib completely isolates them from the other side of the vane. If any one of the screws is tightened substantially beyond the condition shown in FIGURE 4-B, displacement of the rubber will progressively cause local radial bulging of the gasket periphery until a condition as shown is reached. The degree of tightening required, of course, will depend on the relative fit between the vane and seat ring 16. Thus it is possible, by this gasket assembly, to effect differential adjustment of the gasket throughout its circumference. By comparison to an arrangement as shown in the Kinzie et al. Patent No. 2,083,154 or Fawkes Patent No. 3,204,928, as examples, my valve sealing arrangement is very simple, and there are no passages whereby leakage around the gasket can occur.

Although the surface of recess 22 and the rearward surface of gasket 10 are illustrated as being substantially planar, it will be understood that these surfaces may assume other forms such as conical, for example.

It will be understood that various departures from the specifically disclosed embodiment of the invention can be effected without departing from the scope thereof as defined by the following claims:

What is claimed is:

1. In a butterfly valve having a fluid conducting passage and a vane rotatable about a central axis normal to the passage, a stationary valve seat surrounding the vane when in closed position relative to said passage, and a resilient gasket secured to said vane and engageable with said seat to effect a fluid tight seal, said vane providing a peripheral gasket mounting surface in which to receive said gasket, said gasket having a surface on which is contained a raised portion facing said gasket mounting surface and extending continuously around said gasket, said raised gasket portion being supported against said mounting surface and when insufficiently compressed acting to maintain the remainder of said gasket surface spaced from said mounting surface, and means clamping said gasket portion against said mounting surface including a plurality of individually operable means for selectively varying the sealing pressure between different parts of said gasket portion and mounting surface from minimum pressure to effect a seal against said vane to a compression of said portion against said vane sufficient to affect the radial gasket extent thereat.

2. The invention according to claim 1, wherein said clamping means comprises a backup ring and a plurality of screws connecting said ring to the vane.

3. In a butterfly valve having a fluid conducting passage and a vane rotatable about a central axis normal to the passage, a stationary valve seat surrounding the vane when in closed position relative to the passage, said vane having a peripheral gasket mounting surface in which to receive a gasket adapted when said vane is in closed position for engaging said seat in fluid tight relation, a resilient gasket having a surface facing said gasket mounting surface generally parallel thereto and on which is contained a raised rib extending continuously around the gasket in engagement with said gasket mounting surface, said rib when insufficiently compressed acting to maintain the remainder of said gasket surface spaced from said mounting surface, and means clamping said gasket rib against said mounting surface including a plurality of individually operable means for selectively varying the sealing pressure between different parts of said gasket rib and mounting surface from minimum pressure to effect a seal against said vane to a compression of said rib against said vane sufficient to affect the radial gasket extent thereat.

4. The invention according to claim 3 wherein said clamping means includes a plurality of screws passing through apertures in the gasket and connecting the same to the vane.

5. The invention according to claim 4, including a backup ring on the opposite surface of the gasket, with said screws also passing through the backup ring.

6. The invention according to claim 4, wherein said rib extends around the gasket outwardly from said apertures therein which receive said screws.

7. The invention according to claim 3, wherein said gasket mounting surface is provided by a recess in the vane substantially L-shaped in cross-section.

8. In a butterfly valve having a fluid conducting passage and a vane rotatable about a central axis normal to the passage, a stationary valve seat surrounding the vane when in closed position relative to said passage, and a resilient gasket secured to said vane and engageable with said seat to effect a fluid tight seal, said vane providing a peripheral gasket mounting surface against which to receive an opposing face surface of said gasket, at least one of the opposing gasket and vane surfaces containing a raised portion extending toward the other surface substantially continuous around, said raised portion being supported against the opposing surface and when said gasket is insufficiently compressed acting to maintain a spacing between the remainder of said opposing surfaces, and means clamping said gasket against said mounting surface including a plurality of individually operable means for selectively varying the sealing pressure between different parts of said gasket and mounting surface from minimum pressure to effect a seal between said raised portion and the opposing surface to a compression of said gasket against said vane sufficient to affect the radial gasket extent thereat.

References Cited
UNITED STATES PATENTS

| | | | |
|---|---|---|---|
| 480,643 | 8/1892 | Welsh | 277—207 |
| 1,245,002 | 10/1917 | Mastin et al. | 277—207 |
| 2,058,010 | 10/1936 | Fitch | 277—211 |
| 1,624,891 | 4/1927 | Hutchinson et al. | 251—307 |
| 2,586,927 | 2/1952 | Fantz | 251—306 |
| 3,030,068 | 4/1962 | Priese | 251—317 XR |
| 3,083,725 | 4/1963 | Moen | 251—317 XR |

HENRY T. KLINKSIEK, Primary Examiner